United States Patent [19]

Holliday

[11] Patent Number: 5,495,971
[45] Date of Patent: Mar. 5, 1996

[54] AUDIO CASSETTE HOLDER

[76] Inventor: Melba J. Holliday, 263 S. Temple Dr., Milpitas, Calif. 95035

[21] Appl. No.: 180,744

[22] Filed: Jan. 13, 1994

[51] Int. Cl.⁶ ............................................. B60R 7/00
[52] U.S. Cl. .................. 224/483; 224/543; 224/563; 224/901; 206/387.15; 383/39; 383/109
[58] Field of Search ................... 224/42.42, 273, 224/901, 400, 483, 543, 563; 206/387, 387.15; 383/39, 109; 248/205.2

[56] References Cited

U.S. PATENT DOCUMENTS

| | | | |
|---|---|---|---|
| 607,130 | 7/1898 | Rapp | 383/39 |
| 3,422,868 | 1/1969 | Hannum | 383/109 X |
| 3,734,394 | 5/1973 | Dooley | 383/109 |
| 3,876,126 | 4/1975 | Kearney | 224/42.42 |
| 3,949,916 | 4/1976 | Yount | 224/901 X |
| 4,484,701 | 11/1984 | Frohn | 224/273 |
| 4,948,022 | 8/1990 | VanDyke | 224/42.42 |
| 4,979,833 | 12/1990 | Cook | 383/109 X |
| 5,002,400 | 3/1991 | Strand | 383/109 X |

FOREIGN PATENT DOCUMENTS

| | | | |
|---|---|---|---|
| 3730459 | 3/1989 | Germany | 224/42.42 |

OTHER PUBLICATIONS

Page from Carol Wright Gifts Brochure ©1993. First mailed by Carol Wright Gifts on or about Dec. 13, 1993.

*Primary Examiner*—J. Casimer Jacyna
*Attorney, Agent, or Firm*—Skjerven, Morrill, MacPherson, Franklin & Friel; Thomas S. MacDonald

[57] ABSTRACT

An audio cassette holder is made of a folded flexible sheet, preferably a single folded sheet of fabric, having a pair of three cassette-holding loose open-at-the-top pockets on a front side of the folded sheet. A hooks and loops fastener first element is fixedly attached to the rear side of the folded sheet. The holder, more particularly, the fastener first element, is detachably mounted on a complementary hooks and loops fastener second element which second element is adhesively fixed to a holder-supporting surface such as an auto dashboard, auto door inner surface or auto seat, so that a cassette can be easily inserted into and suspended in each pocket and can be safely and easily accessed and removed from a pocket by the auto driver and inserted into a cassette tape player or in the case of a compact disc, removed in its package from a pocket and inserted into a CD player. A closable rear flap is provided to prevent spillage of cassettes when the holder is being hand carried or packed. A method of forming the holder from a single rectangular fabric sheet by a series of folding steps and stitching is also disclosed.

5 Claims, 2 Drawing Sheets

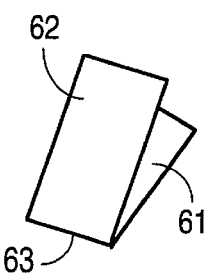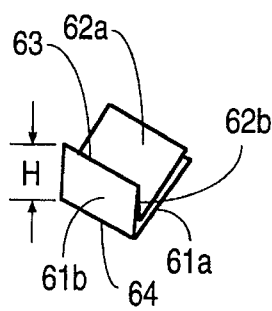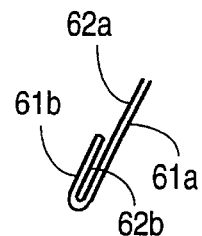
Fig. 6A    Fig. 6B    Fig. 6C    Fig. 6D
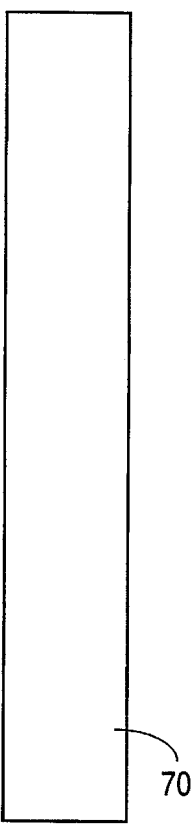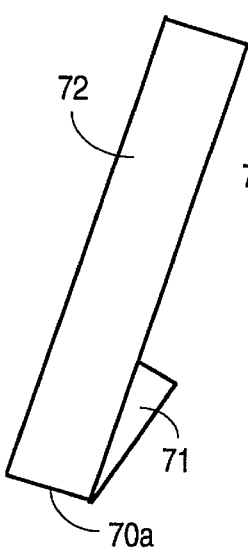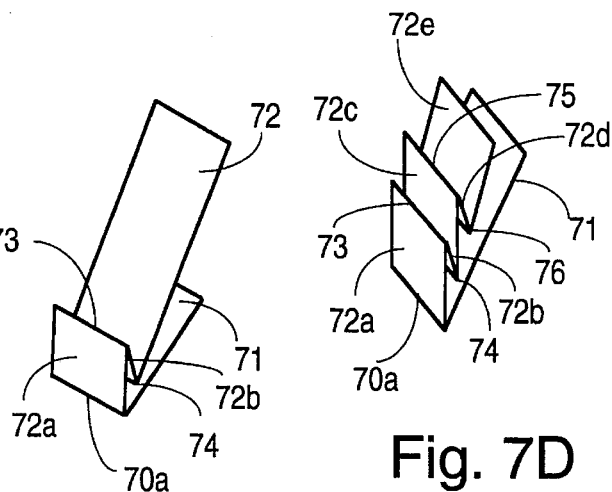
Fig. 7A    Fig. 7B    Fig. 7C    Fig. 7D
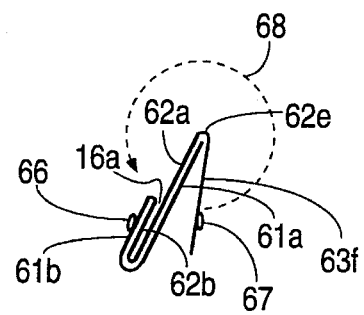
Fig. 8

5,495,971

AUDIO CASSETTE HOLDER

FIELD OF INVENTION

This invention is directed to an audio cassette holder. More particularly, the invention is directed to flexible sheet holder for tape cassettes or the like.

BACKGROUND OF THE INVENTION

Audio tape cassettes are used to supply the tape media for the typical cassette player installed separately or in modern automobile radios. Each tape cassette includes a tape supply reel and a take-up reel and typically are driven in rotational directions by a drive and play mechanism into which the cassette is inserted. Compact discs (CD's) are also insertible into a CD player associated with the radio. Generally, an automobile operator will have a small supply of cassettes with different musical or other audio material on the tapes which cassettes are typically stored in the auto glove compartment, in a front console, in auto door side pocket or in a plastic or wooden container with slots and partitions for insertion of six, eight, less or more cassettes. While driving, it is both time-consuming and dangerous for the auto driver to grope for and pull-out a cassette, as previously stored, since often, it is necessary to take one's eyes off the road ahead to do so. Many automobiles or trucks do not have any really convenient place to store cassettes or compact disc packages. Cassettes can also be "stored" on an unoccupied front seat, but this can result in the smooth-surfaces cassettes sliding off the seat on to the car floor or against the passenger door. Thus, a need has existed for a simple inexpensive, universally mountable and accessible cassette holder either for tape cassettes or compact discs and their cassettes or packages.

SUMMARY OF THE INVENTION

The cassette holder of the invention is constructed from a single, rectangular sheet of cotton or polyester or other fabric which is multi-folded and stitched to form a series of fabric pockets on a front surface which are sized to relatively loosely receive a series of inserted tape cassettes or compact disc packages or cassettes. A hooks and loops fastener first element is simultaneously stitched to the holder when the distal ends of the folded sheet are being suitably hemmed by stitching. A hooks and loops fastener second element is adhesively mounted to a holder-supporting surface such as the auto dashboard, door inside surface or an auto seat surface in a position easily and quickly reached by the auto operator without the operator taking his or her eyes off the road. The cassette holder, more particularly the stitched hooks and loops fastener first element, is then meshed with the fastener second element and the holder with its inserted cassettes being then affixed to that supporting surface. In some instances, the fastener first element may adhere to a surface which is not a hooks and loops surface. If desired, the holder may be left on the adjoining seat or on the driver's seat alongside the operator. With respect to a side-by-side pockets embodiment the holder with cassettes in-the-pocket can be folded together and placed in a jacket pocket or suitcase for availability of the holder and cassettes in a rental car or truck. In a second embodiment, the holder pockets are vertically oriented. Vertically oriented pockets are particularly desirable for holding compact disc (CD) packages. The term "cassette" as used herein includes a CD plastic hinged package. The invention also includes a method of constructing the holder and the pockets from one single rectangular sheet of fabric. In a preferred embodiment, an additional integral double-thickness top flap of fabric is provided which in a "holder-mounted" mode of use extends behind the pocket and under the fastener first element; and in a "storage" mode of use, when the holder is removed from the fastener second element, is folded back across the top of the holder to a position across the pocket openings to prevent the cassettes from falling out of the pockets when carrying a folded holder with cassettes in the pockets.

BRIEF DESCRIPTION OF THE DRAWINGS

FIGS. 6A, 6B, 6C and 6D illustrate each of the folding steps to make the first embodiment of the holder.

FIGS. 7A, 7B, 7C and 7D illustrate the folding steps to make the second embodiment of the invention.

FIG. 8 is a side view of a reversible flap embodiment.

DETAILED DESCRIPTION

Figure 1:
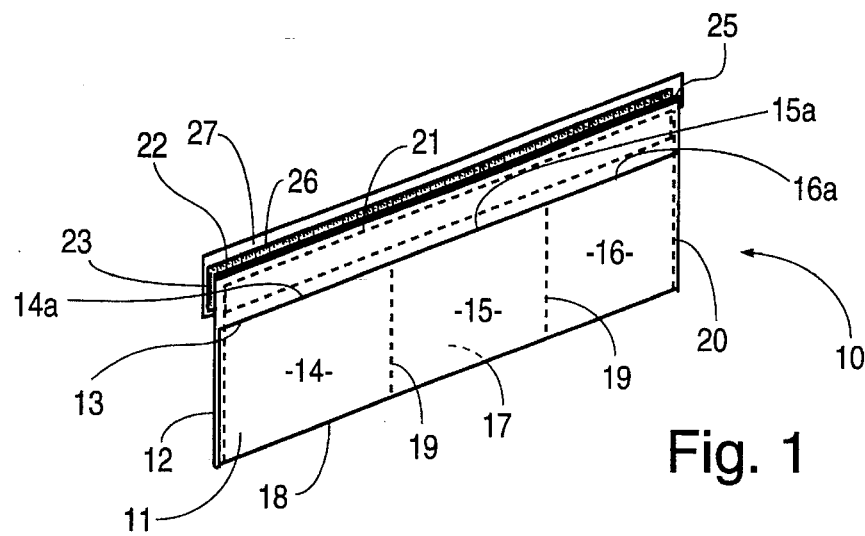
FIG. 1 is a perspective view of a first embodiment of the cassette holder.

As seen in FIG. 1, the cassette holder 10 includes a front surface 11 and rear surface 12 with a series of pockets 14, 15 and 16 all constructed from a single sheet 60 of fabric (FIG. 6A). The fabric sheet is multi-folded first in two halves about fold line 13 and then a double thickness of fabric is folded about fold line 18 to form a large pocket extending from side-to-side. The folded double thickness is then "wrong-side" stitched, or adhesively adhered vertically along lines 19 to form the pockets 14, 15 and 16 with respective cassette entrances 14a, 15a and 16a. The outer edges 20 of the outer pockets 14 and 16 are wrong-side stitched in a vertical line which stitching also extends to the top abutting edges 25 of the holder front surface 11 and rear surface 12. A hooks and loops fastener first element 22, typically a part of a Velcro® fastener, is stitched across the top of the rear surface 12 (FIG. 2) simultaneously with the closure of the top abutting upper transverse folded edges 25 of surfaces 11 and 12 by the same stitching. A rectangular stitch path 21 thus results at the top.

Figure 3:
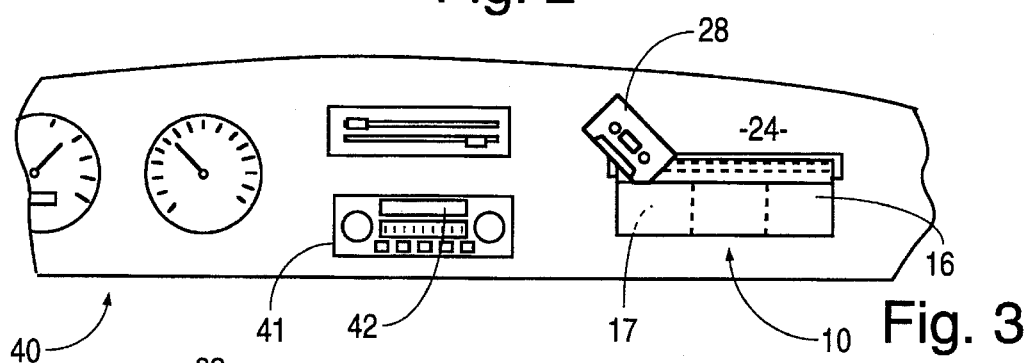
FIG. 3 is a front view of the holder as mounted on an automobile dashboard.

The holder is to be sold with the other second element 23 of the Velcro® type hooks and loops fastener, typically in the form of a corresponding complementary elongated strip meshed with the first element and having a back surface of the second element covered with a contact-type adhesive coating 26 affixed thereto. The adhesive coating is initially covered by a removal tear-off plastic strip 27 which tear-off strip is removable when the holder is to be mounted to allow the second element to be affixed by the contact adhesive to a dashboard, seat or door convenient to the automobile operator. As seen in FIG. 3 the holder 10 is affixed to dashboard 24 next to the automobile instrumentation 40, including a radio 41 and cassette player opening 42. Cassettes 28 are inserted into the interiors 17 of the pockets 14, 15, and 16.

Figure 4:
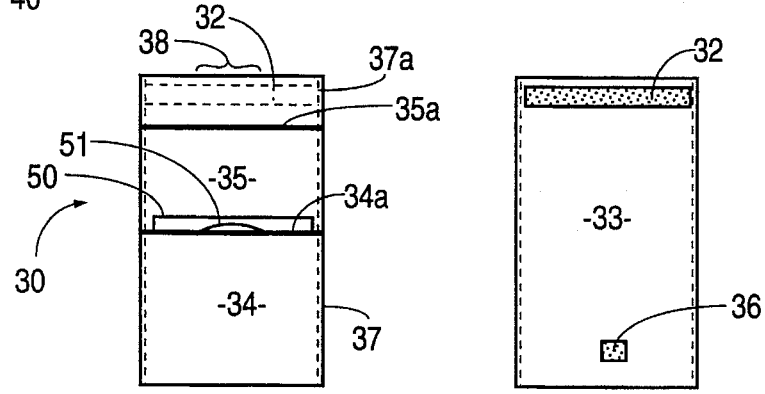
FIG. 4 is a front view of a second embodiment of the holder showing an inserted compact disc package.
Figure 5:
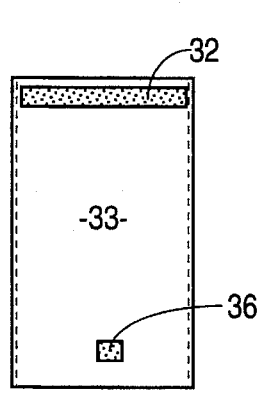
FIG. 5 is a rear view thereof.

In a second embodiment shown in FIGS. 4 and 5, a holder 30 is made of a rectangular single fabric sheet 70 (FIG. 7A) of less width but longer than the sheet used for constructing the embodiment previously described. The sheet is folded as hereafter set forth in FIG. 7B–7D to form two vertically-oriented pockets 34 and 35 having cassette entrances 34a and 35a. The side edges 37 of the pockets and the remaining upper side edges 37a of double fabric thickness are wrong-side stitched leaving a central opening. The piece is then turned right side out. A Velcro® strip first element 32 is then stitched on the holder rear surface 33 while also stitching the central opening in the top edge 38 of the holder front surface and rear surface. An additional dot 36 of Velcro® fastener may be elsewhere placed on the rear surface 33 to prevent flopping of the cassette holder during auto travel and braking. As in the first embodiment, the other Velcro® strip element includes adhesive and tear strip and such element is affixed to an auto cockpit surface. Likewise, a Velcro® dot second element (not shown) can be placed on the cockpit surface below the strip element to interact with dot 36. The pockets can be sized also to accommodate a square flat compact disc plastic package 50 holding a compact disc 51.

Figure 2:
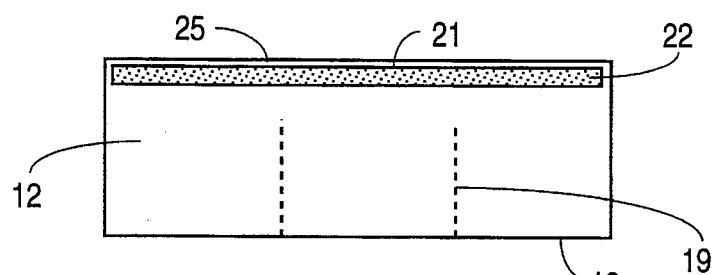
FIG. 2 is a rear view of the holder.

FIGS. 6A–B–C–D illustrate the folding procedure employed for the first embodiment. A rectangular fabric sheet 60 is first folded about fold line 63 to form a rear piece 61 and front piece 62. A double thickness of fabric namely a piece of 61b of rear piece 61 and a piece 62b of front piece 62 is folded about fold line 64 which is separated from parallel fold line 63 in an amount representing the desired height H of the pocket. The double folded pieces are then pressed against the remaining pieces 62a and 61a and stitched as seen in FIGS. 1 and 2.

The second embodiment is similarly constructed utilizing a longer and narrower rectangular sheet of fabric 70 which is first folded about fold line 70a to form a short rear piece 71 and a long tail piece 72. A double thickness of piece 72a and 72b are folded about fold line 73 and then folded about parallel fold line 74 to form a first pocket (FIG. 7C). A piece 72c and piece 72d of the remainder of the tail piece 72 is folded in double thickness about parallel fold lines 75 and 76 to form a second pocket (FIG. 7D). The distance between fold lines 70a–74 and 73 and 75 and 76 represent the height of the vertically-oriented pockets 34 and 35 in FIG. 4. The pockets are then pressed against rear piece 71 matching with the end of remaining height of 72e of the tail piece 72. The side edge 37a (FIG. 4) are wrong-side stitched on the side edges. The piece is then turned right side out through a top central opening 38 and the hooks and loops fastener first element stitched at the top which also closes the central opening as seen in FIG. 4.

A detailed description of one example of the holder is as follows:

A 81 cm by 62 cm rectangular piece of cloth is folded in half with the "wrong sides" together, forming a 40.5 cm by 31 cm rectangular piece 61, 62, 63, FIG. 6b. Fold 63 is moved up about 9 cm forming fold 64 (FIG. 6c). If Velcro dots 66 are to be added (FIG. 8) they will be facing top side 61b. Bottom piece 61a is brought back over the front of piece 62a reversing the fold at 64. The fabric is now inside out. Sides 61a, 61b, 62a, 62b are stitched together. Top 62c is stitched about 9 cm in on each end leaving the center about 9 cm unstitched for turning. The fabric is then turned right side out. Pocket lines 19 (FIG. 1) are then stitched in.

With pockets facing down, flap 63f is folded down about 15 cm around fold line 62e (FIG. 8.) Then Velcro strip 22 (loops or hooks) is stitched to rear surface 61a through four fabric thicknesses. The top edges of the holder front surface and rear surface to are then stitched to close the 9 cm central turning opening. This gives straight double stitching at outer 9 cm edges.

The flap 63f (FIG. 8) is reversibly movable as indicated by arrow 68 over the strip 22 and the top of the holder to a position to overlay across the pocket entrances 14a, 15a, and 16a to prevent spillage of inserted cassettes when the holder 10 is being transported, left on a seat or being packed in a suitcase or carrying bag. The outer surface of 63f may have a Velcro® dot 67.

The Velcro dots 66 can be stitched on the front pockets 14, 15 and 16, at a position 6 cm down from fold 63 and 6 cm from each of the side stitching through both pieces 61, 62. The flap Velcro dots 67 are stitched to back of flap 62f 2.5 cm from the bottom and 2.5 cm from each side. Dots 67 are matched up with dots 66 on the front side when closed creating a flap that will secure the cassettes in the holder when folded or otherwise when being transported or packed.

The above description of embodiments of this invention is intended to be illustrative and not limiting. Other embodiments of this invention will be obvious to those skilled in the art in view of the above disclosure.

I claim:

1. An audio cassette holder comprising:

a flexible sheet having a front surface and rear surface;

a series of cassette-holding pockets on said front surface and each sized to receive and hold an inserted cassette;

a hooks and loops fastener first element attached to said rear surface adjacent to an upper edge of said rear surface;

wherein a hooks and loops fastener second element is attachable to a desired substantial vertical holder-supporting surface such that said first element is detachably connected to said second element to fasten said flexible sheet and said series of pockets to said supporting surface such as to suspendingly hold a cassette inserted into any one of said series of pockets;

wherein said flexible sheet is a single integral sheet of fabric, said sheet of fabric being foldable to form said series of pockets and being stitchable to define the vertical edges of each of said pockets;

wherein said series of pockets linearly extend along said first surface;

in which said sheen of fabric is a rectangular in shape and when multi-folded includes an integral back piece forming said sheet rear surface, an integral inwardly-facing front piece of said pockets, an integral outwardly-facing front piece of said pockets and an integral front outwardly-facing piece above said pockets forming said sheet front surface; and wherein the upper and lower edges of said sheet of fabric are stitched together at an upper top edge of said holder and at the vertical side edges of each of said pockets.

2. The holder of claim 1 in which said fastener first element is attached to said rear surface by the stitching together of the upper and lower edges of the sheet of fabric.

3. The holder of claim 1 in which a portion of said sheet of fabric is additionally folded to form a second pocket between a first pocket and said integral front outwardly-facing piece, such that a pair of vertically-oriented pockets are provided.

4. The holder of claim 1 in which each of the integral pieces of the folded sheet of fabric are stitched vertically between said vertical side edges such that at least one pair of side-by-side-oriented pockets are provided.

5. The holder of claim 1 in which the pieces are folded in seriatim.

* * * * *